United States Patent

Seashore et al.

[19]

[11] Patent Number: 5,916,286
[45] Date of Patent: Jun. 29, 1999

[54] PORTABLE AUTOMOBILE DIAGNOSTIC TOOL

[76] Inventors: Jay E. Seashore, 16822 S. 14th St., Phoenix, Ariz. 85048; William J. Miller, 435 E. Barbara, Tempe, Ariz. 85281

[21] Appl. No.: 08/528,933

[22] Filed: Sep. 15, 1995

[51] Int. Cl.$^6$ .................................................. G06F 17/40
[52] U.S. Cl. ................................................. 701/29; 701/33
[58] Field of Search ....................... 364/424.04, 424.034, 364/424.037, 424.038, 424.039, 431.12, 551.01; 395/427, 430, 182.12, 183.22; 73/116, 117.2, 117.3; 34/50, 55; 340/438, 439; 341/50, 51, 107

[56] References Cited

U.S. PATENT DOCUMENTS

| | | | |
|---|---|---|---|
| 4,757,463 | 7/1988 | Ballou et al. | 364/424.04 |
| 4,823,305 | 4/1989 | Holdren et al. | 395/850 |
| 4,975,846 | 12/1990 | Abe et al. | 364/424.037 |
| 5,005,129 | 4/1991 | Abe et al. | 364/424.036 |
| 5,140,321 | 8/1992 | Jung | 341/55 |
| 5,491,418 | 2/1996 | Alfaro et al. | 340/825.07 |
| 5,491,631 | 2/1996 | Shirane et al. | 364/424.04 |
| 5,530,847 | 6/1996 | Schieve et al. | 395/183.14 |
| 5,541,840 | 7/1996 | Gurne et al. | 364/424.038 |
| 5,572,206 | 11/1996 | Miller et al. | 341/51 |

OTHER PUBLICATIONS

Mark Nelson, *The Data Compression Book, 1992, M&T Publishing Co. pp. 277–311.

*Primary Examiner*—Tan Q. Nguyen

[57] ABSTRACT

A portable automotive diagnostic tool (30) for receiving information from an automotive computer of a vehicle. The portable automotive diagnostic tool (30) is battery powered. The portable automotive diagnostic tool (30) comprises a microcontroller (31), a display (32), a keypad (33), a flash memory (34), a SRAM (35), a battery backup circuit (36), a ROM (37), a UART (38), and a port (39). Automotive codes for configuring the portable automotive diagnostic tool (30) are stored in flash memory (34). The automotive codes are compressed to increase storage to the flash memory (34). The flash memory (34) is non-volatile and retains the automotive codes when power is removed. The automotive codes are updated by writing new automotive codes to the flash memory (34). Information or data received from an automotive computer is stored in SRAM (35). The battery backup circuit (36) powers the SRAM (35) to maintain the information to be taken to a different location when the power is turned off.

25 Claims, 3 Drawing Sheets

PORTABLE AUTOMOBILE DIAGNOSTIC TOOL

BACKGROUND OF THE INVENTION

This invention relates, in general, to automotive diagnostic tools, and more particularly, to an automotive diagnostic tool which receives information from an automotive computer of an automobile.

The automobile has played an important role in increasing the range in which a human is able to travel on a daily basis. In fact, the automobile has permeated our society to the extent that we have become reliant on the automobile for our transportation needs. The automobile became an indispensable part of daily life when its price was reduced to an affordable level for the average working man and woman. Still, the purchase of an automobile is not a trivial issue, other than the purchase of a home, it is typically the next most expensive purchase made.

In the past, maintaining and repairing an automobile was a popular way to reduce the cost of owning an automobile. The mechanical nature of the automobile allowed one to understand its operation without significant special training. This is no longer true in a modern automobile even though the principles of operation are still the same. The increased complexity of the automobile resides in the addition of electronics to control every facet of automobile operation. The use of microprocessors and sensor technology throughout a car has allowed much finer control of its operation thus allowing today's automobile to provide more power with greater fuel efficiency while reducing the amount of toxic emissions. The addition of electronics has also discouraged most people from maintenance and repair because the electronics must be interfaced to diagnose a problem. The equipment used by professional automotive technicians to interface with the electronics of an automobile is cost prohibitive (typically greater than one thousand dollars) for someone wanting to tune-up or make minor repairs on one or two vehicles. Moreover, the average person is intimidated because he or she has little or no knowledge on how electrical devices operate (such as a microprocessor) or how the electronic system controls the automobile.

The integration of semiconductor devices within an automobile has mirrored the development and advancements of the semiconductor industry. Electronics have permeated every facet of the automobile, from fuel pumps to engine control. Microcontrollers are used extensively throughout an automobile to more efficiently operate all mechanical functions. No better example of this technical sophistication is the engine management system of an automobile. The engine computer rapidly senses engine parameters via sensors such as exhaust, air intake, fuel, temperature etc. and makes adjustments to minimize exhaust pollution, minimize fuel consumption, and maximize engine power. The results have been dramatic, today's automobile provides far more luxury, reliability, efficiency, and safety than its brethren of just a few years ago.

An automotive microcontroller is also used as a diagnostic tool for indicating problems. Data from sensors used on the automobile provide information that is stored by a microcontroller when an event occurs which is outside normal operating parameters. Also, the microcontroller can be used to take a "snapshot" of the output of each sensor at a particular point in time while an automobile is operating. In general, the microcontrollers are programmed to identify problems and to output data which would indicate a course of action in the repair of an automobile. The information stored on the microcontroller is ported out for analysis. For example, information from an engine management system is downloaded for providing data on the spark, fuel, air intake, or exhaust of an automobile. The information is used to determine if the engine is operating correctly. The automotive microcontroller can also be programmed to recognize specific faults based on the operating information. The identified fault is stored in memory as a fault code which can be received with the operating information to help diagnose a problem. Information on fault codes are typically written in a service manual for an automobile. A service manual defines each fault code and suggests potential sources for each problem associated with a fault code which greatly aids in the diagnosis of a problem.

Automotive diagnostic tools currently offered in the marketplace for interfacing with an automotive computer are tailored for the professional auto mechanic. In general, an automotive diagnostic tool is designed to be a permanent piece of hardware in an automobile repair facility. Most automotive diagnostic tool are not truly portable, for example, some are built on a cart for easy mobility and for providing a large readout screen but cannot easily be carried from location to location. An automotive diagnostic tool also is typically powered from a standard AC wall outlet since they are used on a continuous basis. The mobility is thus limited to the length of the power cord.

A typical auto mechanic works on a wide variety of automobiles. An automotive diagnostic tool for the professional mechanic must have the capability of interfacing with each type of automotive computer used by automobile manufacturers to provide full service. A further complication is the fact that each automobile manufacturer has its own interface and methodology for handling information. Also, it is quite common for an automobile to have more than one microcontroller. Microcontrollers are used to control everything from the power seats, radio, and climate control system to the mechanical operation of the engine and transmission. The professional auto mechanic requires access to all this information to provide complete service. One common approach for storing the information on interfacing with different automobile types is to place it on a Read Only Memory (ROM) cartridge. The ROM cartridge is then plugged into an auto diagnostic tool. The cost of the auto diagnostic tool is increased when the cost of additional ROM cartridges are factored in. A new ROM cartridge is purchased yearly that includes updated information on new model cars.

The cost of owning a professional automobile diagnostic tool is prohibitive to an average car owner concerned with maintaining one or two different automobiles. Moreover, the level of electronic sophistication provided by the professional automobile diagnostic tool in accessing all information available from an automotive computer system would be overwhelming to someone interested in diagnosing items of simple repair or maintaining an automobile in optimum running condition.

It would be of great benefit if an automobile diagnostic tool could be provided that was inexpensive, yet allowed a person of average mechanical skill to access information on an automotive computer for providing general maintenance on an automobile.

SUMMARY OF THE INVENTION

Briefly stated, a portable automobile diagnostic tool is described herein. The portable automobile diagnostic tool couples to an automobile computer for retrieving information on the operating status of an automobile. The portable automobile diagnostic tool comprises a microcontroller, a flash memory, a keypad, a Liquid Crystal Display (LCD), and a Static Random Access Memory (SRAM). The microcontroller is coupled to the keypad, flash memory, LCD, and SRAM. To retrieve information, the portable automobile diagnostic tool is coupled to an automotive computer via a cable. The automobile make and model is selected from a list displayed on the LCD. An automobile code corresponding to the automobile make and model is found in the flash memory. The automobile code is decompressed and used to configure the microcontroller to receive information from the automotive computer of the selected vehicle. The information stored by the automotive computer is downloaded by the portable automobile diagnostic tool and stored in the SRAM. The information is then accessed by the user and displayed on the LCD to determine the automobile status. A battery back up circuit maintains power to the SRAM when the power is turned off which allows the information to be reviewed at any time or place. The automobile codings are updated by compressing the automobile codings and writing them into the flash memory. The flash memory is non-volatile and maintains the automobile codings in memory even if power is removed.

A method of operating an automobile diagnostic tool is disclosed. The method includes decompressing an automobile code stored in memory for configuring the automobile diagnostic tool to receive information. The decompressed automobile codings are searched for the make and model of a vehicle under test. Once the appropriate automobile coding is found and decompressed, it is used to configure the automobile diagnostic tool. The automobile diagnostic tool then accesses and receives information from an automotive computer of the automobile.

DETAILED DESCRIPTION OF THE DRAWINGS

Figure 1:
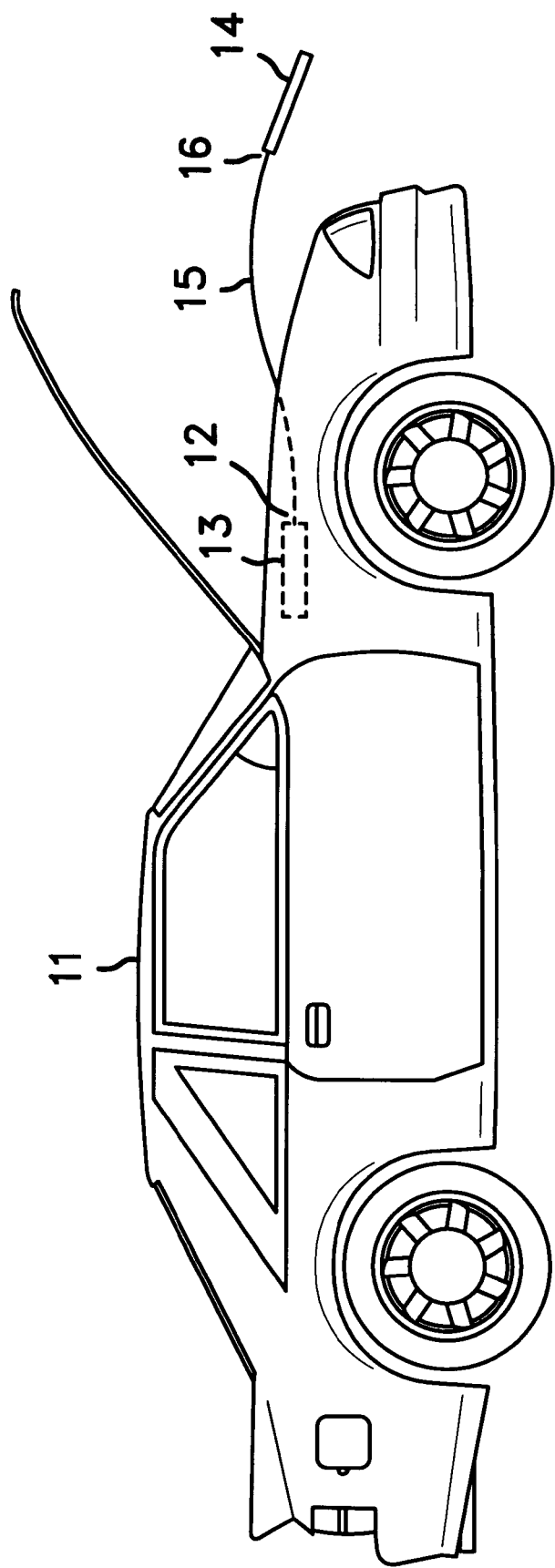
FIG. 1 is an illustration of a portable diagnostic tool coupling to an automotive computer within an automobile.

An automobile diagnostic tool is a tool for accessing information from an automotive microcontroller (microprocessor). In general, today's automotive microcontroller controls every aspect of the operation of an automobile. An automotive microcontroller is coupled to sensors which monitor and feedback information at extremely small time intervals (for example, millisecond intervals). Developments in sensor technology have increased the control and resolution in which mechanical operations can be measured and analyzed. In particular, an engine management microcontroller is used to optimize performance, maximize fuel economy, and minimize pollutants. The engine management microcontroller monitors and controls such things as the air intake, spark, timing, and the fuel of an engine.

An engine management microcontroller takes into account such factors as the throttle position, ambient temperature, air density, fuel mixture, and other data received from sensors to operate the engine at peak efficiency. The information or data from the sensors is monitored and evaluated at such a rapid pace that small changes in the engine operation are reviewed and acted upon as incremental modifications. Incremental control of the automobile engine maximizes power and fuel economy while reducing exhaust emissions.

Microcontrollers are not only used on an engine of an automobile but are prevalent throughout the automobile. For example, microcontrollers are used to control such systems as the transmission, instrument cluster, climate control system, trip computers, power seats, and stereo system. Clearly, the pervasive use of electronics has made today's automobile more reliable, efficient, and luxurious then previous generations.

An automotive microcontroller is designed by a manufacturer to do more than control a system, most are capable of identifying or reporting problems. Typically, information monitored or sensed by the automotive microcontroller is compared against data stored in local memory. The information stored in memory contains operating parameters for maintaining the system at optimum performance. Adjustments to the system are made when a difference is detected between the stored operating parameters and the monitored information. A problem in a system occurs when an automotive microcontroller must make significant adjustments, or it cannot respond to the monitored information to keep a system operational. The automotive microcontroller typically retains monitored information concerning a problem event. An alternative that is often employed is to have a data bank of common problems stored in memory, if the monitored data corresponds to a common problem stored in memory, an error code is retained that can be accessed from the automotive microcontroller to indicate the problem.

An automobile diagnostic tool interfaces with the automotive microcontroller to retrieve information pertaining to the operating status of the automobile to aid in the diagnosis of a problem. For example, an error code is retrieved by an automobile diagnostic tool. A service manual for the particular automobile would list the error code, describe the problem, offer detailed information on further testing of the system, or provide a solution to the problem. Another type of data that is retrieved is sensor information. Sensor information is sampled while the system is operating, if the sample is taken while an abnormality occurs the information can be used to identify the problem.

FIG. 1 is an illustration of an automobile 11 having an automotive computer 12 for controlling the operation of automobile 11. Automotive computer 12 has a port 13. A portable automobile diagnostic tool 14 is used to access information from automotive computer 12. Portable automobile diagnostic tool 14 has a port 16. In the preferred embodiment, a cable 15 couples to ports 13 and 16 for interconnecting portable automobile diagnostic tool 14 to automotive computer 12. An alternative to cable 15 is to place low power transmitter/receiver circuitry on both automotive computer 12 and portable diagnostic tool 14 to provide cableless communication.

Although the automotive microcontroller increases ones ability to analyze a fault within an automotive system, it has had just the opposite effect on the general public. Automobile repair and maintenance is no longer a mainstream activity used to reduce the cost of owning an automobile. A major reason for this is the average person is intimidated by the electronic controls which have been added to an automobile. Another factor is the high cost of the professional tools for interfacing with an automotive microcontroller. The cost of the tool cannot be justified by the limited use it would have for a common car owner.

As mentioned previously, a ROM cartridge is used with a professional automobile diagnostic tool to provide information on automobile codes for different car models and manufacturers. A ROM cartridge is designed to plug into a professional automobile diagnostic tool. Updated ROM cartridges are provided yearly that include automobile codes of a new model year. A ROM cartridge that costs several hundred dollars is justifiable to an auto repair shop servicing hundreds of vehicles but would not be acceptable to an average car owner interested in maintenance of his or her car. Furthermore, there is no immediate solution for updating for an automobile type not included on the ROM cartridge. The owner of this type of automobile diagnostic tool must order and wait until a new cartridge is sent by the manufacturer. Moreover, the use of a memory cartridge is not reliable over a long period of time. Constant use, oxidation of the plug, and environmental conditions (automobile heat and contaminants such as grease) will eventually make the plug in cartridge unreliable unless cleaned an maintained on a regular basis.

A portable automobile diagnostic tool is described herein that interfaces with an automotive microcontroller for retrieving information. The portable automobile diagnostic tool is simple to use and is priced to be affordable to an average car owner. A car owner that is interested in maintaining or performing simple repairs has significantly different requirements than a professional automobile technician.

A car owner typically interfaces with only a few different types of automobiles (the cars he or she owns). A professional automobile technician must be prepared to handle any type of automobile that is received by its shop. Along these same lines a car owner does not need to interface with every system of a vehicle. Most car owners are interested in maintaining the engine and systems peripheral to the engine (starter, alternator, fuel system etc.). Tailoring an automobile diagnostic tool to only the functions needed by a non-professional mechanic will reduce complexity and cost of manufacture.

Making an automobile diagnostic tool portable aids an average car owner in several ways. Information can be received from an automobile no matter where it is located. For example, if a car is broken or running improperly information can be obtained. Also, a typical car owner does not have either the knowledge or information to handle every type of failure that occurs to an automobile. Portability allows a user to take the automobile diagnostic tool to someone who may be of help, for example, a person in an auto parts store who is more knowledgable and has access to a wide variety of technical manuals. A small size and light weight will also increase portability. This is not as much of a factor for a professional mechanic as evidenced by prior art professional automobile diagnostic tools that are large and bulky which is adequate when working in a small area such as a booth or bay.

It is important that an automobile diagnostic tool for general consumption will not become technically obsolete in the future and does not have expensive hidden fees. Prior art, professional automobile diagnostic tools have automobile codings stored in a plug in ROM cartridge. A new ROM cartridge must be purchased to update to new models entering the marketplace. A programmable automobile diagnostic tool would eliminate this requirement. A programmable automobile diagnostic tool is one in which updated automobile codings can be downloaded directly to the unit without the need of removable cartridges and their associated problems. Programmability also is attractive since the automobile diagnostic tool would be less likely to become obsolete as new model cars come out. Also, a user would be able to load in a particular automobile code that is rare or not stored in the unit without delay by coupling to a database having the particular automobile code thereby reducing repair time on a vehicle.

Figure 2:
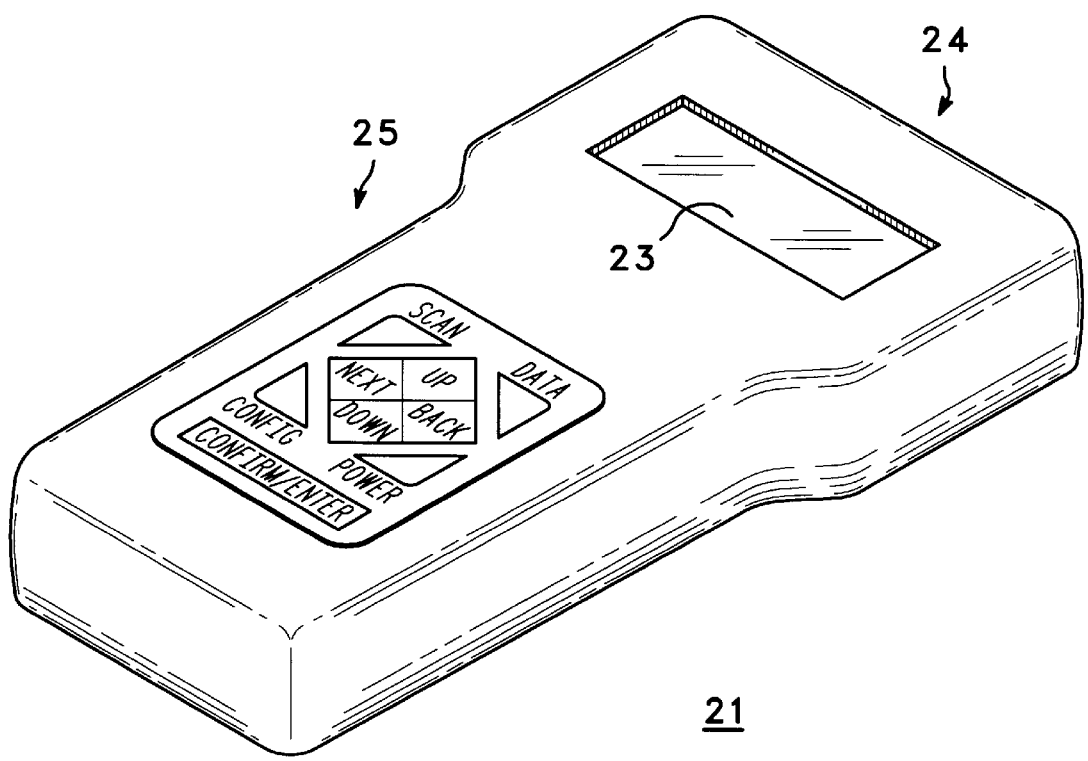
FIG. 2 is an illustration of a portable diagnostic tool in accordance with the present invention.

FIG. 2 is an illustration of a portable diagnostic tool 21 that is easily held in the palm of a hand. Portable diagnostic tool 21 includes a keypad 22, a display 23, and a port 24. In the preferred embodiment, a handle area 25 of portable diagnostic tool 21 is made narrow to fit in the palm of a hand. Rounded edges on side areas of portable diagnostic tool 21 make it easier to hold.

Display 23 displays information and instructions on the operation of portable diagnostic tool 21. Display 23 is placed in an area of portable diagnostic tool 21 that is wider than handle area 25 to allow for an increased display size. Port 24 is a receptacle for receiving a cable to interconnect to an automotive computer.

Keypad 22 has a limited number of buttons so as not to intimidate a user who has never interfaced to an automotive computer before. Keypad 22 has a SCAN button, DATA button, CONFIG button, POWER button, CONFIRM/ENTER button, UP button, DOWN button, NEXT button, and BACK button.

The keys of keypad 22 are identified in two groups. A first group of keys are the function keys which comprise the POWER button, the DATA button, the SCAN button, and the CONFIG button. The POWER button enables and disables portable diagnostic tool 21. The DATA button changes a data mode of portable diagnostic tool 21 for either operational data or error (trouble) code data. The SCAN button actuates portable diagnostic tool 21 for capturing data from an automotive computer of an automobile. The CONFIG button configures each of function keys.

A second group of keys on keypad 22 are the navigation keys for controlling the information displayed on display 23. The UP button scrolls or moves up to display data in a stream of data. The DOWN button scrolls or moves down to display data in the stream of data. The NEXT button causes the next data in the data stream to be displayed on display 23. The BACK button moves to display the previous data in the stream of data. The CONFIRM/ENTER button selects an option or confirms an option.

The keys described hereinabove allow a user to configure portable diagnostic tool 21 to a specific automobile make and model. Once configured for the automobile make and model, portable diagnostic tool 21 is set to retrieve information from the automotive computer. One type of information received from an automotive computer is error or trouble codes which indicate the type of problem which is occurring in an automobile. Another type of information is sensor information from the automobile sensors which provides a "snapshot" of an automobile or vehicle under test under specific operating conditions. The sensor information is extremely useful in debugging a problem that does not correspond to an error code. An automotive computer may also save sensor information during the course of operation that is out of specification and requires reviewing via portable diagnostic tool 21 to determine if a problem is present.

Figure 3:
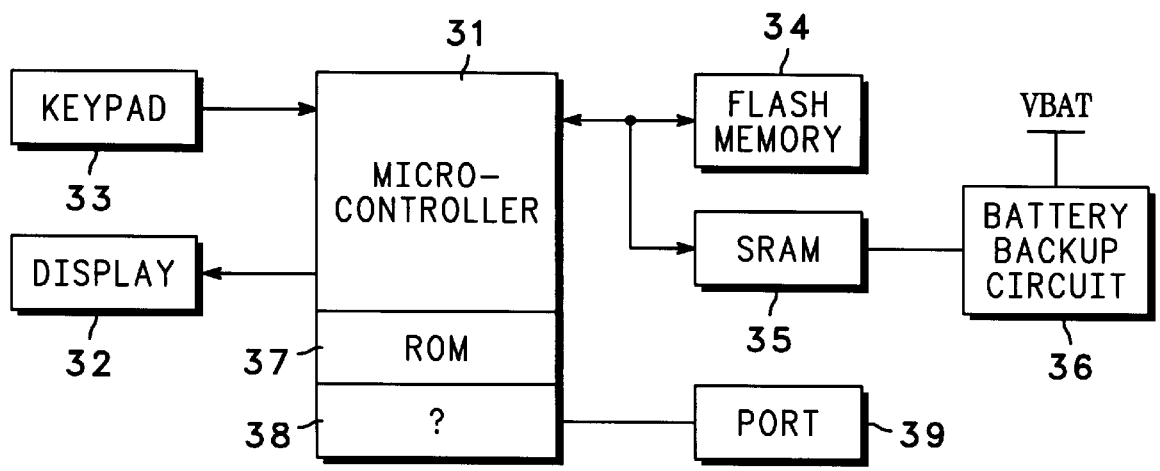
FIG. 3 is a schematic diagram of a portable diagnostic tool in accordance with the present invention.

FIG. 3 is a schematic diagram of a portable automobile diagnostic tool 30. Portable automobile diagnostic tool 30 comprises a microcontroller 31, a display 32, a keypad 33, a flash memory 34, a Static Random Access Memory (SRAM) 35, a battery backup circuit 36, a Read Only Memory (ROM) 37, a Universal Asynchronous Receiver/Transmitter (UART) 38, and a port 39. In the preferred embodiment, display 32 is a Liquid Crystal Display (LCD). All elements disclosed hereinabove are housed in the housing illustrated in FIG. 2. In particular, the electronic components including flash memory 34 are placed and interconnected on a printed circuit board within a housing. Integrating all components on a single printed circuit board makes automobile diagnostic tool 30 shock resistant and eliminates unneeded external plugs that can lead to reliability problems.

Microcontroller 31 couples to display 32, keypad 33, flash memory 34, SRAM 35, ROM 37, and UART 38. In the preferred embodiment, ROM 37 and UART 38 are built-in with microcontroller 31. Port 39 couples to UART 38. Battery back-up circuit 36 couples to SRAM 35 and receives a supply voltage VBAT that couples to a battery (not shown). In the preferred embodiment, portable automobile diagnostic tool 30 is powered by a battery. Battery operation eliminates the need for a power cord and allows portable automobile diagnostic tool 30 to be used in remote locations. Prior art, automobile diagnostic tools for a professional mechanic are not battery operated because the constant use of the tool would drain a battery. A power supply system is built into a professional automobile diagnostic tool which increases cost, reduces portability due to the AC cord required, and increases the size and weight of the tool. An alternative approach used is to provide cables that attach to the battery of the car being tested to power the automobile diagnostic tool. The power cables are clumsy, decrease reliability as they fatigue, dangerous due to the moving components of the automobile and increase the size of the diagnostic tool.

Microcontroller 31 controls the operation of portable automobile diagnostic tool 30. Keypad 33 is used to input control signals to microcontroller 31. Display 32 displays information or data provided by microcontroller 32. Portable automobile diagnostic tool 30 cannot communicate with an automotive computer of a vehicle under test without being configured. Different automotive manufacturers and even different model types of the same manufacturer may require a different configuration for receiving information. For example, a stream of data output by an automotive computer provides information from each sensor coupled to the automotive computer. The automotive coding includes information that identifies what data corresponds to what sensor. Different models by the same manufacturer could have a different number of sensors or a different sequence in which the information is output which requires a different automobile coding.

Automotive codings for configuring portable diagnostic tool 30 to different automotive manufacturers and model types are stored in flash memory 34. Flash memory 34 is a non-volatile read/write memory. Automotive codes for configuring portable automobile diagnostic tool 30 are stored in flash memory 34. The automotive codes are retained in flash memory even when the power is turned off. The fact that flash memory is writeable allows new automotive codes to be written into flash memory 34 (via port 39) for updating automotive codes stored therein. Since flash memory 34 is placed on a printed circuit board with other electronic components of portable diagnostic tool 30 it does not have to be removed for an update thereby increasing reliability. Updating is achieved by coupling a source of new automotive codes (for example, a computer) to port 39 and downloading the information to flash memory 34. Prior art automotive diagnostic tools are not updateable through a port which increases the cost to a user since updating requires the purchase of a new ROM card or non-volatile memory cartridge with the updated automotive codes. Moreover, non-volatility of flash memory 34 allows power to be completely removed from portable automobile diagnostic tool 30 without losing the automotive codes.

In the preferred embodiment, the automotive codes stored in flash memory 34 are compressed using a data compression technique to increase the amount of data stored and to reduce the size of flash memory required thereby decreasing manufacturing costs. In general, two types of compression techniques developed by Jacob Ziv and Abraham Lempel known as LZ77 and LZ78 provide significant compression of data. LZ77 is a "sliding window" technique in which a dictionary consists of a set of fixed-length phrases found in a "window" into the previously processed data. LZ78 builds phrases up one symbol at a time, adding a new symbol to an existing phrase when a match occurs. Other types of compression techniques could also be employed to increase the space utilization of flash memory 34. Implementations of LZ77 and LZ78 as well as other data compression techniques are taught in a book titled "The Data Compression Book" by Mark Nelson, 1992, M & T Publishing Company which is hereby incorporated by reference.

ROM 37 and a portion of flash memory 34 are used to store programming for operating portable diagnostic tool 30. In the preferred embodiment, a list is stored in ROM 37 or flash memory 34 that identifies the location in flash memory of an automobile code for each vehicle type. The user enters information which identifies a specific vehice type. The list is then searched until the corresponding automobile code is found. The memory locations for the automobile code is read from the list and provided to flash memory 34. The compressed automobile code corresponding to the selected vehicle is read from flash memory 34. A decompression algorithm is stored in either ROM 37 or flash memory 34 for decompressing the compressed automotive codes. In the preferred embodiment, only the automobile code of a selected vehicle is read from flash memory 34 and decompressed with a decompression algorithm. SRAM 35 is used to store the automotive code after it is uncompressed and to store information or data received from an automotive computer of a vehicle under test. The uncompressed automobile code is used to configure portable automobile diagnostic tool 30 for receiving information from the selected vehicle. Battery backup circuit 36 senses when power is turned off to portable automotive diagnostic tool 30 and couples power to SRAM 35. Battery backup circuit 36 allows information received from a vehicle under test to be maintained in SRAM. Power drain of a SRAM under static conditions is minimal and has only a slight effect on battery life. A cable plugs into port 39 to couple an automotive computer of a vehicle under test to UART 38. The operating speeds and data transfer rates of different automotive computers varies with each design. UART 38 synchronizes the transfer of data between microcontroller 31 and an automotive computer of a vehicle under test.

An example of a typical usage of portable automotive diagnostic tool 30 best illustrates advantages over prior art diagnostic tools. Automotive codings are compressed and loaded into flash memory 34 during manufacture. Portable automotive diagnostic tool 30 can be shelved indefinitely at a store without losing the automotive codings due to the non-volatile characteristic of flash memory 34 thus a store owner will never have obsolete inventory. New automotive codings can be written to flash memory 34 via port 39 without purchasing additional components or sending the unit to the manufacturing facility.

In general, portable automotive diagnostic tool 30 is marketed towards people who want to maintain and repair their own automobile. This does not preclude a professional auto-mechanic from using portable automotive diagnostic tool 30, in fact, there are many features that are advantageous to a skilled professional. A user configures portable automotive diagnostic tool 30 for a specific model and make. A cable is used to couple between the automotive computer of a vehicle under test and port 39. Battery power increases flexibility for receiving information under almost any condition. For example, some automotive computers are conveniently located within an automobile cabin. Portable automobile diagnostic tool 30 can be coupled to the automotive computer within easy reach as the automobile is driven. A "snapshot" of the operating conditions of the engine can be taken when an intermittent problem occurs during normal operation with portable automobile diagnostic tool 30. The user may not be sophisticated enough to interpret all the information from each sensor of an automobile of the "snapshot" to deduce the problem after scrolling through the information. Portable automobile diagnostic tool 30 is then powered down and the information of the "snapshot" stored in SRAM (powered by battery backup). Portable automobile diagnostic tool 30 can then be taken to someone with more expertise. For example, an auto parts store (which sells the tool) would want to provide additional expertise in the analysis of problems. After analyzing the problem by reviewing the information provided by portable automobile diagnostic tool 30 and determining a solution, the auto parts store would more than likely be able to sell the required fix up parts to the automobile owner. The auto parts store is also an ideal location for providing updated automotive codes to purchasers of portable automotive diagnostic tool 30.

Figure 4:
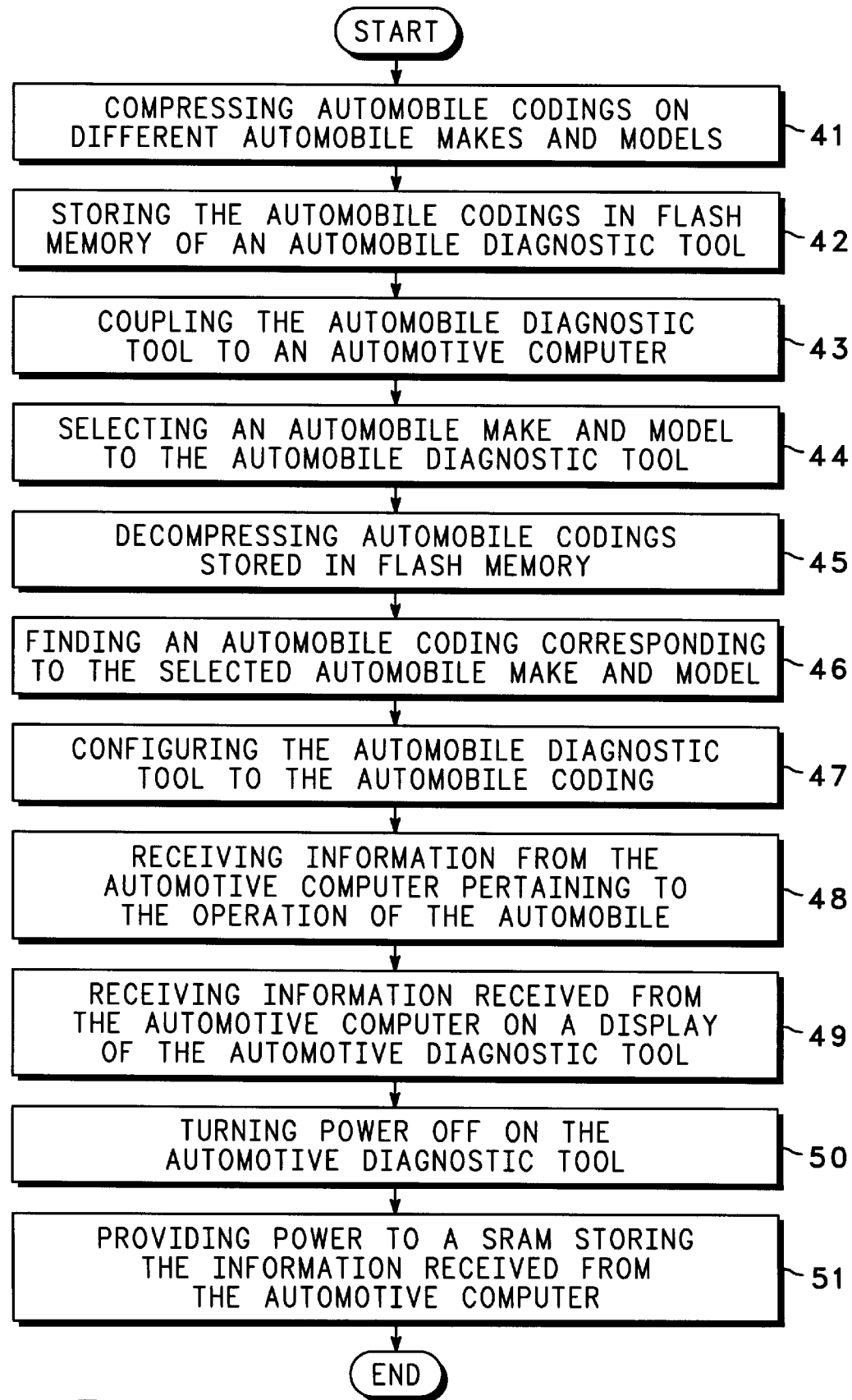
FIG. 4 is a flow diagram illustrating operating steps of the portable automotive diagnostic tool 30 of FIG. 3.

FIG. 4 is a flow diagram illustrating operating steps of the portable automobile diagnostic tool 30 of FIG. 3. A step 41 comprises compressing automobile codings on different automobile makes and models. Using compression techniques increases the number of automobile makes and models that are stored in a memory thereby reducing manufacturing costs.

A step 42 comprises storing the automobile codings in flash memory. Flash memory is non-volatile so power is not required to retain the automobile codings. Flash memory is also writeable so the automobile codings can be updated as required.

A step 43 comprises coupling the automobile diagnostic tool to an automotive computer of a vehicle under test. The automobile diagnostic tool and the automotive computer are coupled via a cable.

A step 44 comprises entering an automobile make and model to the automobile diagnostic tool. The automobile make and model is selected from a table of vehicle types displayed by the automobile diagnostic tool. In the preferred embodiment, a list in stored in either ROM or flash memory that identifies memory locations of the compressed automobile code corresponding to selected vehicle type.

A step 45 comprises finding an automobile coding corresponding to the selected automobile make and model. The list is searched until a match is found corresponding to the selected vehicle. The memory locations corresponding to the compressed automobile code is read from the list and provided to the flash memory for reading.

A step 46 comprises decompressing automobile codings stored in flash memory. In particular, the compressed automobile code corresponding to the selected vehicle is read from flash memory. The automobile code is decompressed using a decompression algorithm stored in the automobile diagnostic tool. The decompressed automobile code is stored in a SRAM of the automobile diagnostic tool.

A step 47 comprises configuring the automobile diagnostic tool to the automobile coding. The automobile coding describes a format used in the automotive computer.

A step 48 comprises receiving information from the automotive computer pertaining to the operation of the automobile. The information retrieved from the automotive computer is stored in the SRAM.

A step 49 comprises reviewing information received from the automotive computer. The information can be reviewed on a display included in the automotive diagnostic tool. The information can also be scrolled through by use of a keypad.

A step 50 comprises a step of turning power off on the automotive diagnostic tool.

A step 51 comprises a step of providing power to the SRAM storing information received from the automotive computer. Retaining information allows the automotive diagnostic tool to be transported to other locations and reviewed at any time.

Although the mechanical operation of an automobile has not changed significantly, the sophisticated electronics used to increase the efficiency of a car has made it extremely difficult to perform routine maintenance by an average automobile owner. By now it should be appreciated that an automobile diagnostic tool has been described that simplifies a task of determining an operating status of an automobile. The automobile diagnostic tool is battery operated which allows information to be received or monitored at any location. Automotive codes are stored in non-volatile read/writeable memory which can be updated for different make and model cars. Data compression techniques are employed to increase the number of automotive codes stored while reducing the memory size. Power can also be removed without fear of losing the automotive codes due to the non-volatile nature of flash memory. A battery backup circuit is employed to maintain information in SRAM (received from an automotive computer). This allows information to be transported to a different location or to be reviewed at a later date with the power turned off.

While specific embodiments of the present invention have been shown and described, further modifications and improvements will occur to those skilled in the art. It is understood that the invention is not limited to the particular forms shown and it is intended for the appended claims to cover all modifications which do not depart from the spirit and scope of this invention.

We claim:

1. A portable automobile diagnostic tool comprising:
   a microcontroller for receiving information from an automotive computer of a vehicle under test;
   a flash memory coupled to said microcontroller for storing information on automobile codings for a plurality of automobiles, said flash memory being writeable for updating said automobile codings and wherein automobile codes stored in said flash memory are compressed;
   a keypad coupled to said microcontroller for entering operations of the portable automobile diagnostic tool;
   a Static Random Access Memory (SRAM) coupled to said microcontroller for storing information received from said automotive computer of said vehicle under test; and
   a display coupled to said microcontroller for displaying information received from said automobile computer of said vehicle under test.

2. The portable automobile diagnostic tool as recited in claim 1 wherein said flash memory is nonvolatile for retaining said automobile codings when power is removed from the portable automobile diagnostic tool.

3. The portable automobile diagnostic tool as recited in claim 1 wherein the portable automobile diagnostic tool is powered by a battery to allow it to be operated remotely.

4. The portable automobile diagnostic tool as recited in claim 1 wherein the SRAM is powered by a battery back up circuit when power is turned off on the portable automobile diagnostic tool thereby retaining information received from said automotive computer of said vehicle under test.

5. The portable automobile diagnostic tool as recited in claim 1 wherein said automobile codings are compressed using a LZ77 compression algorithm.

6. The portable automobile diagnostic tool as recited in claim 1 wherein said automobile codings are compressed using a LZ78 compression algorithm.

7. The portable automobile diagnostic tool as recited in claim 1 wherein said automobile codings are decompressed and stored in said SRAM when an automobile model and make is selected.

8. The portable automobile diagnostic tool as recited in claim 1 further including a Read Only Memory (ROM) coupled to said microcontroller for storing software for operating the portable automobile diagnostic tool.

9. The portable automobile diagnostic tool as recited in claim 1 further including:
a port coupled to said microcontroller; and
a cable for coupling between said port and said automotive computer of said vehicle under test wherein information from said vehicle under test is coupled through said cable to said port and received by said microprocessor.

10. The portable automobile diagnostic tool as recited in claim 9 further including a Universal Asynchronous Receiver/Transmitter (UART) coupled between said port and said microcontroller for synchronizing a transfer of information between said automotive computer and said microcontroller.

11. The portable automobile diagnostic tool as recited in claim 1 wherein said microprocessor, said flash memory, and said SRAM are afixed to a printed circuit board within the portable automobile diagnostic tool.

12. A method for operating an automobile diagnostic tool, the method comprising:
coupling the automobile diagnostic tool to an automotive computer of a vehicle under test;
selecting an automobile make and model corresponding to said vehicle under test;
finding an automobile coding stored in memory corresponding to said vehicle under test;
decompressing said automobile coding corresponding to said selected automobile make and model;
configuring the automobile diagnostic tool with said decompressed automobile coding to receive information from said automotive computer of said vehicle under test; and
receiving information from said automotive computer of said vehicle under test.

13. The method as recited in claim 12 further including the steps of:
receiving automobile codings;
using a compression algorithm on said automobile codings; and
storing compressed automobile codings in said memory wherein said compression algorithm decreases memory size and increases a number of automobile codings being stored in said memory.

14. The method as recited in claim 13 further including the steps of:
creating a list identifying memory locations of each compressed automobile coding to a vehicle type;
searching said list for said selected automobile make and model;
finding said memory location corresponding to said selected automobile make and model; and
reading a compressed automobile code from said memory at said memory location corresponding to said selected make and model.

15. The method as recited in claim 13 further including the steps of:
choosing said memory of the automobile diagnostic tool as a flash memory wherein said flash memory is nonvolatile for allowing power to be removed from the automobile diagnostic tool without affecting automobile codings stored therein.

16. The method as recited in claim 12 wherein said step of receiving information from said automotive computer of said vehicle under test includes the steps of:
storing said information from said automotive computer of said vehicle under test in a Static Random Access Memory (SRAM); and
providing a battery back up circuit for powering said SRAM when power is turned off in the automobile diagnostic tool thereby retaining said information from the automotive computer and allowing it to be read at a later time.

17. An automobile diagnostic tool for receiving information from an automotive computer of a vehicle under test, the automobile diagnostic tool comprising:
a microcontroller for interfacing with the automotive computer of the vehicle under test;
a flash memory responsive to said microcontroller for storing automobile codings for a plurality of automobiles, said automobile codings being stored in a compressed format in said flash memory;
a keypad coupled to said microcontroller for entering operations of the automobile diagnostic tool;
a Static Random Access Memory (SRAM) responsive to said microcontroller for storing data from said automobile computer of said vehicle under test;
a battery backup circuit coupled to said SRAM for providing power to said SRAM when power is turned off to the automobile diagnostic tool; and
a display for displaying information received from said automobile computer of said vehicle under test.

18. The automobile diagnostic tool as recited in claim 17 wherein an automobile coding is decompressed and stored in said SRAM when a make and model of said vehicle under test is selected and wherein said automobile coding is used to configure the automobile diagnostic tool for receiving information from the automotive computer of said vehicle under test.

19. The automobile diagnostic tool as recited in claim 17 wherein said automobile codings are compressed using a LZ77 compression algorithm.

20. The automobile diagnostic tool as recited in claim 17 wherein said automobile codings are compressed using a LZ78 compression algorithm.

21. The automobile diagnostic tool as recited in claim 17 wherein said flash memory is non-volatile for retaining said automobile codings when power is removed from the automobile diagnostic tool.

22. The automobile diagnostic tool as recited in claim 17 wherein the automobile diagnostic tool is powered by a battery to allow it to be operated remotely.

23. A method for storing information on automobile codes in an automobile diagnostic tool, the method comprising the steps of:

compressing automobile codes; and storing compressed automobile codes in memory.

24. The method as recited in claim 23 wherein said step of storing automobile codes in memory includes a step of storing said automobile codes in a non-volatile read/write memory in the automobile diagnostic tool.

25. The method as recited in claim 24 further including a step of decompressing an automobile code corresponding to a selected vehicle type for configuring the automobile diagnostic tool for receiving information from an automotiive computer of said selected vehicle type.

* * * * *